UNITED STATES PATENT OFFICE.

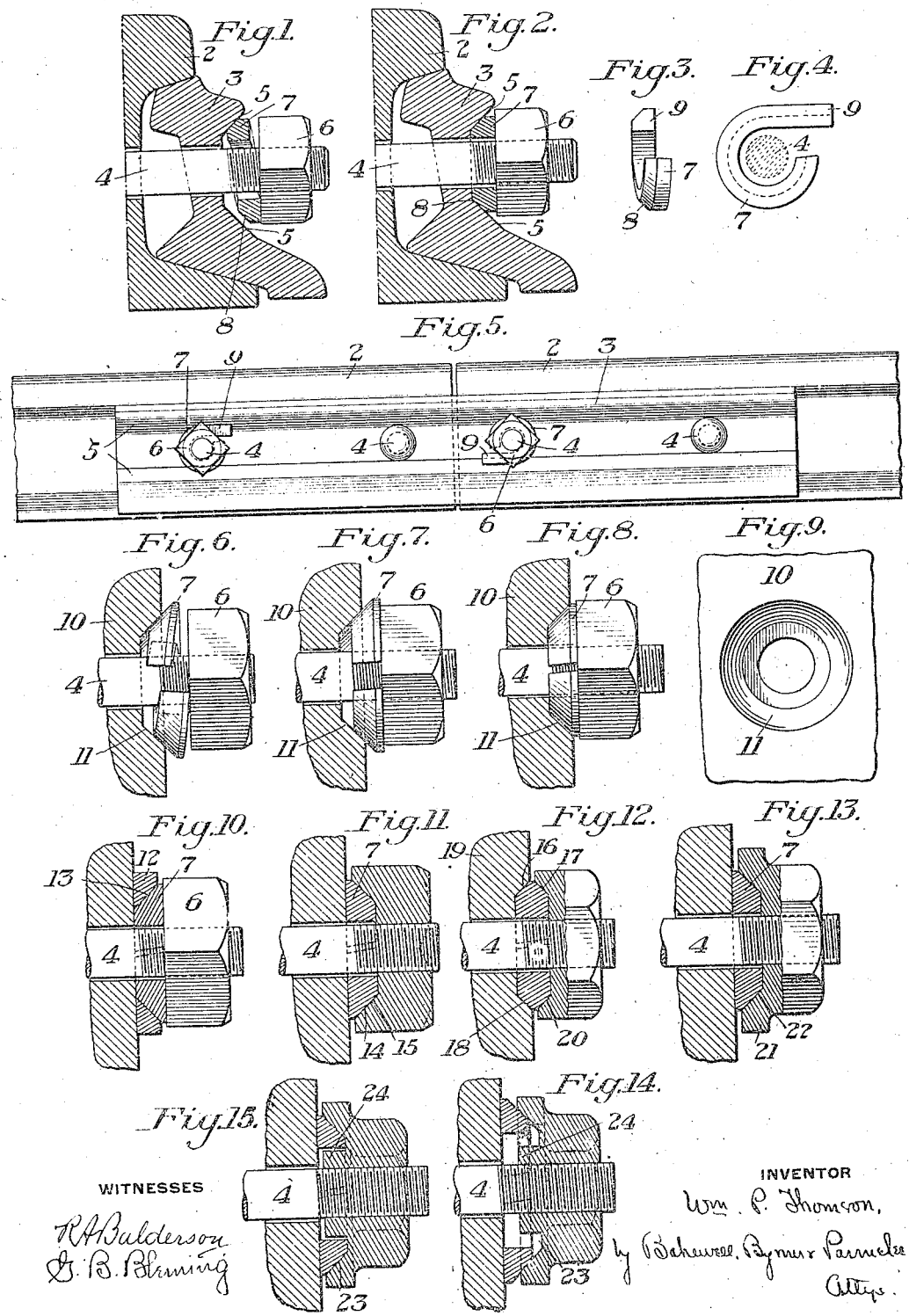

WILLIAM P. THOMSON, OF PHILADELPHIA, PENNSYLVANIA.

NUT-LOCK.

1,147,568.   Specification of Letters Patent.   Patented July 20, 1915.

Application filed March 13, 1914. Serial No. 824,414.

*To all whom it may concern:*

Be it known that I, WILLIAM P. THOMSON, a citizen of the United States, and a resident of Philadelphia, in the county of Philadelphia and State of Pennsylvania, have invented a new and useful Improvement in Nut-Locks, of which the following is a full, clear, and exact description, reference being had to the accompanying drawings, forming part of this specification, in which—

Figure 1 is a sectional view, partly broken away, showing one form of my invention applied to a rail joint, the locking washer being shown in partial seated position. Fig. 2 is a similar view showing the washer completely seated. Fig. 3 is an edge view and Fig. 4 a plan view of one form of washer. Fig. 5 is a side elevation of a rail joint having applied thereto the locking washers of Figs. 3 and 4. Figs. 6, 7 and 8 are views, partly in section and partly in side elevation, showing a modified form of the nut lock, the locking washer being shown in three different stages of its seating in the three views. Fig. 9 is a front or plan view of a portion of the bearing plate. Figs. 10, 11, 12 and 13 are detail sectional views, showing four other forms of the invention. Figs. 14 and 15 are similar views showing still another form; Fig. 14 showing the washer partly seated and Fig. 15 showing it completely seated.

My invention has relation to nut locks, and more particularly to nut locks of the skew or split washer type.

The object of my invention is to provide a nut lock of this character having means whereby when the nut is tightened the split washer will be closed radially, that is, compressed to a smaller diameter, without clamping tightly on the bolt, thereby greatly increasing its locking action without diverting any of the clamping power of the nut through the nut lock to the bolt; my nut lock thus has its complete freedom to move along the bolt undiminished by a frictional or other bearing against the bolt at any stage of the clamping by the nut.

My invention is susceptible of various modifications; several preferred forms of which are shown in the accompanying drawings, and will now be described, it being premised, however, that I do not limit myself to the particular constructions and arrangements illustrated and described except as defined by the appended claims.

Referring first to that form of my invention shown in Figs. 1 to 5 inclusive, the numeral 2 designates a portion of a track rail, 3 a splice bar applied thereto, and 4 the joint bolts. The splice bar 3 is shown as being of the form which has a channeled outer nut bearing face with inwardly converging double surfaces 5 above and below its bolt holes.

6 designates the nut, and 7 the locking washer. This washer is of the split skew type, adapted to be flattened out into a substantially true plane when the nut is screwed home. In this respect it is similar to other skew washers heretofore used. As above stated, however, my invention provides means whereby, as the nut is screwed home and the washer is flattened, its diameter will be decreased and the decrease in diameter restricted without utilizing the peripheral surface or the threads of the bolt as a bearing. For this purpose, I provide that face of the washer which is to seat against the inclined surfaces 5 of the splice bar with the truncated cone bearing surfaces 8; the bevel of which is at substantially the same angle as that of the beveled surfaces 5. The washer being placed in position, as shown in Fig. 1, the nut is screwed home in the usual manner, thereby flattening, or taking the twist out of, the washer; and at the same time as it is forced against the beveled surfaces 5, its diameter is materially decreased until this decrease is stopped by the splice bar bearing face which lies at a right angle to the axis of the bolt, the ends of the washer closing inwardly toward each other. Inasmuch as it might happen that a careless placing of the washer would bring the open split ends directly above or directly below the bolt, in which location the drawing up of the nut might act to spread the ends of the washer apart, thus opening up the washer instead of closing it in radially, I preferably provide this form of washer with the tail extension 9, at one of its ends. This extension may lie against one of the beveled faces 5, either above or below the bolts, as shown in Fig. 5. It forms an efficient guard against the careless placing of the washer, since it renders it impossible for the opening in the washer to lie opposed to either of the beveled faces of the splice bar. The washer must, therefore, close radially in the desired manner when the nut is screwed home.

It will be readily seen that decreasing the diameter of the nut lock in the manner above described greatly increases its resistance to the backing off of the nut, and very greatly adds to the power of the lock over and above the usual resistance of nut locks of this type having only the twist therein.

In Figs. 6, 7, 8 and 9, I have shown another form of the invention in which a similar but augumented result may be obtained without the tail piece on the washer. In this form of my invention, I provide the member 10, against which the coned face of the washer seats, with a truncated conical recess 11. Fig. 6 shows the position of the washer when first seated; Fig. 7 its position after the nut has been partially screwed up and the twist taken out of the washer, but without any substantial decrease in its diameter; and Fig. 8 shows the washer in its completely seated position, wherein it has been closed to a considerable extent until the closing has been stopped by the upright inner face of the washer coming in contact with the bottom of the recess 11, which bottom lies at a right angle to the axis of the bolt.

In Fig. 10, I have shown another way of accomplishing results without forming an integral recessed seat in the bearing member. In this form, I provide the truncated conical recess for the truncated cone face of the washer with the aid of a supplementary seat or collar 12, which may be of any suitable external form, and which is reamed out or otherwise constructed to provide the truncated conical recess 13; in this case, the stop to the closing action of the nut lock is provided by another clamped member, independent of the collar 12.

In the form shown in Fig. 11, I obtain a similar result by forming a truncated cone bearing 14 on the outer face of the washer, and by providing the inner end portion of the nut with a truncated conical recess 15 for coaction with the surface 14; the bottom of this recess provides a stop to the closing action of the nut lock as previously noted.

Fig. 12 shows a form of the invention in which the locking washer is provided with two truncated cone surfaces 16 and 17, a truncated cone shaped recess 18 being formed in the bearing member 19 for coaction with the surface 16, while the nut is formed with a truncated cone shaped recess 20, described and shown in Fig. 11 to coact with the surface 17. In this form the wedging and stopping action is distributed between the nut and one of the clamped members. This enables a somewhat shallower recess to be made in the nut and is advantageous because the length of the threaded hole in the nut is left nearly as great as if there were no recess.

In Fig. 13, I have illustrated a special construction of the nut in which the length of the threaded hole may be increased, rather than diminished, as compared with the length of the threaded hole of an ordinary nut. This is accomplished by providing the nut with the flanged portion 21 at its inner end, the truncated cone shaped recess 22 being formed in this flanged portion. This figure also shows the wrench-fitting body of the nut as hexagonal in shape, thus reducing its long diameter as compared with the long diameter of a square nut. This feature, however, is not essential, as the wrench-fitting portion may be made square if desired.

Figs. 14 and 15 show another form of the invention, in which the construction is similar to that of Fig. 11; but the truncated cone shaped recess 23 instead of extending to the edges of the bolt hole, is of annular form and is separated from the bolt by an intervening annulus 24 of solid metal. This annulus may be internally threaded with a continuation of the thread of the nut, thus increasing the length of the threaded bearing. At the same time the location of the recess 23 at a substantial distance from the bolt hole gives a greater leverage to prevent the nut from backing off. The placing of the nut lock bearing at a substantial distance from the bolt hole results advantageously, in that there is no liability of the nut lock overlapping the unthreaded bolt hole in the seat when closed; and, therefore, there is no danger of chamfering or otherwise damaging the corner of the bolt hole in a way to reduce the effective bearing of the locking washer.

Fig. 14 shows the relation of the nut lock to the seat and to the nut after the nut lock has had the ordinary twist taken out of it; while Fig. 15 shows the completely seated position of the nut lock after the bottom of the recess has stopped the closing action of the nut lock.

While in all the forms illustrated, I have shown the recesses which coöperate with the nut lock as of truncated conical form, the shape of these recesses may obviously be modified in various ways.

The advantages of my invention will be apparent, since it greatly increases the efficiency of nut locks of this general type with very little, if any, added cost. When used against clamped members such as shown in Figs. 1 and 2 which are already provided with channeled surfaces to coact with the truncated cone shaped surfaces of the washers, there is no necessity for providing any special coöperating means. When these channeled surfaces are not present, the truncated cone shaped recesses in the bearing member, or in the nut, or both, can be formed at a slight additional expense.

It will be noted that as the locking washer is compressed to decrease its diameter, it is positively resisting away from the corner of the bolt hole in one of the clamped members. This is also a feature of importance. In the use of the ordinary washer the edges of this bolt hole are often damaged, as well as the thread of the bolt.

It is apparent that the descriptive use of the conformation of the surfaces of the nut lock or recesses as truncated cone-shaped must not be taken too literally, as the same effect may be attained by curving, or partially curving, these faces, in which case it is only essential that a curved portion of such a face which is to act as a stop to the closing action of the nut lock shall lie substantially at a right angle to the axis of the bolt. It is essential, however, to an embodiment of my invention that the construction utilize the novel feature of providing a means of terminating the decrease in diameter of the nut lock, without requiring the use of either the body or the threaded portion of the bolt as a stop to such movement.

I claim:

1. In a bolted structure, the combination of a member to be clamped, a bolt, a nut, and a split spring nut lock interposed between the nut and the said member, said nut lock and at least one of the parts between which it is seated having coöperating cam or wedging surfaces which effect a radial closing of the lock as the nut is tightened, said lock, when in completely loose position having an internal diameter at least as great as the maximum diameter of the adjacent portion of the bolt plus the maximum of decrease in such diameter that can be effected by the closing action of said cam or wedging surfaces, substantially as described.

2. In a bolted structure, the combination of a spring nut lock having substantially parallel opposed faces and also having a beveled face which intersects one of said opposed faces, a nut against which the one of said opposed faces of the nut lock bears, a clamped member which affords a bearing surface for one of said opposed faces of the nut lock and another bearing surface for the beveled face of the nut lock, said bearing surface of the clamped member engaging said beveled surface of the nut lock in such a co-active manner as to produce a slidable shifting of one of the opposed faces of said nut lock, across the surface against which it bears, as the proximity of the nut and of said bearing surface of the clamped member is varied.

3. In a bolted structure, the combination of a member to be clamped, a bolt, a nut, and a split spring nut lock interposed between the nut and the said member, said nut lock and at least one of the parts between which it is seated having coöperating cam or wedging surfaces which effect a radial closing of the lock as the nut is tightened, and also having substantially parallel bearing surfaces for the inner and outer faces of the lock, said lock, when in completely loose position having an internal diameter at least as great as the maximum diameter of the adjacent portion of the bolt plus the maximum of decrease in such diameter that can be effected by the closing action of said cam or wedging surfaces, substantially as described.

4. In a bolted structure, the combination of a member to be clamped, a bolt, a nut, and a split spring nut lock interposed between the nut and the said member, said nut lock and at least one of the parts between which it is seated having coöperating cam or wedging surfaces which effect a radial closing of the lock as the nut is tightened, and one of the parts, which has a cam or wedging surface, acting as a stop to any further advance of the nut on the thread of the bolt before the nut lock grips the bolt, substantially as described.

5. In a bolted structure, the combination of a member to be clamped, a bolt, a nut, and a split spring nut lock interposed between the nut and the said member, said nut lock and at least one of the parts between which it is seated having coöperating cam or wedging surfaces which effect a radial closing of the lock as the nut is tightened, and also having substantially parallel bearing surfaces for the inner and outer faces of the lock, said faces acting as a stop to limit the closing of the lock before it grips the bolt, substantially as described.

In testimony whereof, I have hereunto set my hand.

WILLIAM P. THOMSON.

Witnesses:
McLeod Thomson,
Royal W. Urie.